(12) United States Patent
Bredno et al.

(10) Patent No.: US 10,573,001 B2
(45) Date of Patent: Feb. 25, 2020

(54) QUALITY CONTROL OF AUTOMATED WHOLE-SLIDE ANALYSES

(71) Applicants: Ventana Medical Systems, Inc., Tucson, AZ (US); HOFFMANN-LA ROCHE INC., Little Falls, NJ (US)

(72) Inventors: Joerg Bredno, San Francisco, CA (US); Astrid Heller, Penzberg (DE); Gabriele Hoelzlwimmer, Penzberg (DE)

(73) Assignees: Ventana Medical Systems, Inc., Tucson, AZ (US); Hoffmann-La Roche, Inc., Little Falls, NJ (US)

( * ) Notice: Subject to any disclaimer, the term of this patent is extended or adjusted under 35 U.S.C. 154(b) by 176 days.

(21) Appl. No.: 15/659,654

(22) Filed: Jul. 26, 2017

(65) Prior Publication Data

US 2018/0012360 A1    Jan. 11, 2018

Related U.S. Application Data

(63) Continuation of application No. PCT/EP2016/051865, filed on Jan. 29, 2016.
(Continued)

(51) Int. Cl.
*G06K 9/00* (2006.01)
*G06T 7/00* (2017.01)
(Continued)

(52) U.S. Cl.
CPC .......... *G06T 7/0014* (2013.01); *G06K 9/0014* (2013.01); *G06K 9/00127* (2013.01);
(Continued)

(58) Field of Classification Search
None
See application file for complete search history.

(56) References Cited

U.S. PATENT DOCUMENTS

| | | | |
|---|---|---|---|
| 6,718,053 B1 * | 4/2004 | Ellis | G01N 15/1475 345/604 |
| 2012/0243755 A1 | 9/2012 | Kaufman | |
| 2012/0330165 A1 * | 12/2012 | Watanabe | A61B 1/00009 600/476 |

FOREIGN PATENT DOCUMENTS

| | | |
|---|---|---|
| WO | 9904244 A1 | 1/1999 |
| WO | 0184209 A1 | 11/2001 |

OTHER PUBLICATIONS

International Preliminary Report on Patentability dated Aug. 10, 2017 in corresponding PCT/E P2016/051865 filed on Jan. 29, 2016, pp. 1-12.
(Continued)

*Primary Examiner* — Atiba O Fitzpatrick
(74) *Attorney, Agent, or Firm* — Charney IP Law LLC; Thomas M. Finetti

(57) ABSTRACT

The subject disclosure presents systems and methods for automatically selecting meaningful regions on a whole-slide image and performing quality control on the resulting collection of FOVs. Density maps may be generated quantifying the local density of detection results. The heat maps as well as combinations of maps (such as a local sum, ratio, etc.) may be provided as input into an automated FOV selection operation. The selection operation may select regions of each heat map that represent extreme and average representative regions, based on one or more rules. One or more rules may be defined in order to generate the list of candidate FOVs. The rules may generally be formulated such that FOVs chosen for quality control are the ones that require the most scrutiny and will benefit the most from an assessment by an expert observer.

25 Claims, 9 Drawing Sheets

Related U.S. Application Data

(60) Provisional application No. 62/110,472, filed on Jan. 31, 2015.

(51) Int. Cl.
*G06T 7/11* (2017.01)
*G06K 9/03* (2006.01)
*G06K 9/20* (2006.01)
*G06K 9/62* (2006.01)
G02B 21/36 (2006.01)
G06F 3/0354 (2013.01)

(52) U.S. Cl.
CPC .............. *G06K 9/03* (2013.01); *G06K 9/2081* (2013.01); *G06K 9/6228* (2013.01); *G06T 7/0012* (2013.01); *G06T 7/11* (2017.01); *G02B 21/365* (2013.01); *G06F 3/03545* (2013.01); *G06K 2209/051* (2013.01); *G06K 2209/21* (2013.01); *G06T 2200/24* (2013.01); *G06T 2207/10056* (2013.01); *G06T 2207/30024* (2013.01); *G06T 2207/30096* (2013.01); *G06T 2207/30168* (2013.01); *G06T 2207/30204* (2013.01)

(56) References Cited

OTHER PUBLICATIONS

International Search Report and Written Opinion dated Apr. 6, 2016 in corresponding PCT/E P2016/051865 filed on Jan. 29, 2016, pp. 1-15.

\* cited by examiner

QUALITY CONTROL OF AUTOMATED WHOLE-SLIDE ANALYSES

CROSS-REFERENCE TO RELATED APPLICATIONS

This patent application is a continuation of International Patent Application No. PCT/EP2016/051865 filed Jan. 29, 2016, which claims priority to and the benefit of U.S. Provisional Application No. 62/110,472 filed Jan. 31, 2015. Each of the above patent applications are hereby incorporated by reference herein in their entireties.

BACKGROUND OF THE SUBJECT DISCLOSURE

Field of the Subject Disclosure

The present subject disclosure relates to imaging for medical diagnosis. More particularly, the present subject disclosure relates to a method for analyzing a stained biopsy or surgical tissue sample being implemented by an image processing system and quality control of automated whole-slide analysis of tissue specimens.

Background of the Subject Disclosure

In the field of digital pathology, biological specimens such as tissue sections, blood, cell cultures and the like may be stained with one or more stains and analyzed by viewing or imaging the stained specimen. Observing the stained specimen, in combination with additional clinical information, enables a variety of processes, including diagnosis of disease, prognostic and/or predictive assessment of response to treatment, and assists in development of new drugs to fight disease. As used herein, a "target" or "target object" is a feature of the specimen that a stain identifies. A target or target object may be a protein, protein fragment, nucleic acid, or other object of interest recognized by an antibody, a molecular probe, or a non-specific stain. Those targets that are specifically recognized may be referred to as biomarkers in this subject disclosure. Some stains do not specifically target a biomarker (e.g. the often used counterstain hematoxylin). While hematoxylin has a fixed relationship to its target, most biomarkers can be identified with a user's choice of a stain. That is, a particular biomarker may be visualized using a variety of stains depending on the particular needs of the assay. Subsequent to staining, the assay may be imaged for further analysis of the contents of the tissue specimen. An image of an entire slide is typically referred to as a whole-slide image, or simply whole-slide.

Quantitative analysis of a whole-slide, such as counting target objects such as cells of a certain kind, or the quantitation of a staining response for all cells on a slide, is not feasible for human observers. Typically, a whole-slide contains several thousand to several hundred thousand cells, of which all or just a fraction may be relevant for an analysis question at hand. Methods from image analysis, computer vision, and pattern recognition can be used for an automated quantitative analysis. Such automation with computer software enables quantitative whole-slide analyses.

Current implementations of whole-slide analyses allow the user to select a number of FOVs for quality control (QC). These FOVs are randomly selected or systematically sampled by the software from all FOVs in the analyzed tissue. A system for automated whole-slide analysis may present a low-magnification view of the whole tissue that shows the position of FOVs for QC. For example, FIG. 1A depicts a low-magnification view, with red rectangles 101 depicting positions of FOVs. For each of these positions 101, an FOV image of higher magnification may be generated as shown in FIG. 1B. A disadvantage of this method is that not all the tissue is presented for QC, only the selected FOVs. Errors of the algorithm in tissue regions that are not visible in the presented FOVs cannot be detected by the observer. Even if QC images and FOV selections are interactively generated, for instance by presenting a low magnification image such as the one in FIG. 1A in a graphical user interface (GUI) enabling a user to select (for example with a mouse click) a region of interest, this process is also tedious and requires the observer to interact with the GUI until she or he is satisfied that all relevant regions of tissue have been observed.

SUMMARY OF THE SUBJECT DISCLOSURE

Embodiments of the invention provide a method for analyzing a stained biopsy or surgical tissue sample and a respective image processing system as claimed in the independent claims. Further embodiments of the invention are given in the dependent claims.

In accordance with embodiments of the invention a whole-slide image is received by the image processing system. For example, the whole-slide image that has been previously obtained from a histopathological tissue slide of a stained tissue sample is read from an electronic memory of the image processing system for processing in order to obtain a result of the detection of one or more biological target objects. Hence, by reading the whole-slide image from electronic memory, the whole-slide image is received. Embodiments of the invention may also encompass the acquisition of the whole-slide image by means of an optical sensor, such as a microscope. In the latter case the whole-slide image may be received by performing an image acquisition step using the sensor.

The whole-slide image is analyzed by execution of an image processing algorithm for detection of biological target objects. Depending on the implementation, a quantitative result is obtained, such as a count for a given target object that indicates the overall number of target objects within the whole-slide image or within a region of the whole-slide image. The quantitative result may be output on a display of the image processing system and visualized as a heat map.

The variation of the intensity and appearance of a staining of tissue on the histopathological tissue slide, staining artefacts and other histopathological artefacts may cause an erroneous detection of a target object by execution of the image processing algorithm. Such histopathological artefacts are as such known, cf. JOMPF REVIEW ARTICLE, Year: 2014, Volume: 18, Issue: 4, Page: 111-116 "Artefacts in histopathology" Shailja Chatterjee (http://www.jomfp.in/printarticle.asp?issn=0973-029X; year=2014;volume=18;issue=4;spage=111;epage=116;aulast=Chatterjee) which provides a comprehensive overview of histopathological artefacts, such as forceps artefacts, crush artefacts, fulguration artefacts, fixation artefacts, artefacts introduced during specimen transport, freezing artefacts, processing artefacts, artefacts due to folds and others.

Depending on the intensity and appearance of a staining of tissue on the slide or the presence of artefacts, the computer software, i.e. the image processing program that implements the image processing algorithm, might miss target objects, such as cells, that should be included in the analysis or misinterpret non-target structures (for example, staining artefacts) as target objects.

In accordance with embodiments of the invention, quality control images show the analyzed tissue together with algorithm detection results, for example as color-coded marks and symbols overlaid on the original image. In order to see these algorithm results on a cell-by-cell level, such an image may be shown in magnification, such that only a small fraction of all tissue can be presented in one image.

In accordance with embodiments of the invention a quality check is performed on the whole-slide image using the target objects that have been potentially erroneously detected by execution of the image processing algorithm.

For performance of the quality check FOVs of the whole-slide image are defined and at least one rule is applied to the FOVs for checking whether a criterion is fulfilled for a given FOV. If the criterion is fulfilled, this indicates a risk for that FOV containing a histopathological artefact and/or erroneous analysis results caused by imperfections of the image processing algorithm, i.e. an erroneous detection result as regards the detection of one or more target objects in the given FOV that may have been caused not by a histopathological artefact but by the image processing algorithm itself.

For example, the total number of biological target objects detected in a given FOV by the image processing algorithm is calculated and the FOVs are sorted by the number of the respective total target objects in accordance with the rule. If the total number of target objects within a FOV is either very high or very low this may indicate the presence of a histopathological artefact and/or erroneous analysis results. In this case the criterion that is associated with the rule may be that a given FOV is a top ranking or a low ranking FOV on the sorted list. In particular, the topmost and the bottom FOV from the list are selected.

At least a sub-set of the set of FOVs that is identified by applying the at least one rule is displayed on a display of the image processing system for review by an observer, such as a pathologist. The image processing system may comprise a graphical user interface that enables the image processing system to receive an entry signal from the observer that indicates whether the quality of an image portion of one of the displayed FOVs from the sub-set is sufficient for the analysis. In other words, if the observer identifies a histopathological artefact in a displayed FOV of the sub-set, he or she may operate an element of the graphical user interface, such as by a mouse click, pressing a button or using a data entry stylus, to signal to the image processing system that the respective FOV contains a histopathological artefact.

In the event that such an entry signal is received by the image processing system, the result of the detection of the biological target objects that is output by the image processing system may be an error signal for signaling that automated analysis results in the displayed tissue region are not correct or not meaningful, for example because the quality of the whole-slide image is insufficient for performing an analysis.

Alternatively, a portion of the whole-slide image is selected, such as by means of an annotation tool, and excluded from the analysis. In the latter case, the result that is output by the image processing system indicates the detected biological target objects that have been obtained by execution of an image processing algorithm but excluding target objects that have been identified in the excluded image region that contains the histopathological artefact or erroneous analysis results. The latter case has the advantage, that the stained biopsy tissue sample may still be used for research and/or diagnostic purposes with the required degree of scientific certainty due to the exclusion of the image area that contains the histopathological artefact without burdening the observer with a lengthy and tedious review process of a large number of FOVs as due to the application of the at least one rule only candidate FOVs are displayed that are likely to contain an artefact.

Embodiments of the present invention are particularly advantageous as a quality control is introduced into an image processing system that relies on the image processing algorithm that is used for the detection of biological target objects; no specific image processing algorithm for artefact detection is required.

For example, depending on the intensity and appearance of a staining of tissue on the slide or the presence of artefacts, the computer software, i.e. the image processing program that implements the image processing algorithm, might miss target objects, such as cells, that should be included in the analysis or misinterpret non-target structures (for example, staining artefacts) as target cells. In accordance with embodiments of the invention, quality control images show the analyzed tissue together with algorithm detection results, for example as color-coded marks and symbols overlaid on the original image. In order to see these algorithm results on a cell-by-cell level, such an image may be shown in magnification, such that only a small fraction of all tissue can be presented in one image.

Embodiments of the invention are particularly advantageous as a high degree of reliability of the quality control may be obtained by having the observer review only a minimal number of FOVs from the large number of FOVs, such as hundreds, thousands or even millions FOVs. This is especially important for a whole-slide image that covers a relatively large area and thus may contain a very large number of FOVs.

The subject disclosure solves the above-identified problems by providing systems and methods for automatically selecting meaningful regions on a whole-slide image and performing QC on the resulting collection of FOVs. The automatic selection is performed subsequent to determining a presence and quantity of relevant objects such as cells based on a response to a staining assay applied to the tissue on the slide. Subsequent to the detection, density maps or heat maps may be generated, quantifying the local density of the detection results. The heat maps may depict positive and negative detection results, as well as objects classified as "object of no interest", as well as a local ratio of cell densities. The heat maps as well as combinations of maps (such as a local sum, ratio, etc.) may be provided as input into an automated FOV selection operation. The selection operation may select regions of each heat map that represent extreme and average representative regions, based on one or more rules. One or more rules may be defined in order to generate the list of candidate FOVs. The rules may generally be formulated such that FOVs chosen for quality control are the ones that require the most scrutiny and will benefit the most from an assessment by an expert observer. The disclosed operations therefore mitigate tedious whole-slide QC procedures that are either interactive or require a large number of FOVs, while also avoiding incomplete QC where artefacts can be missed by choosing FOVs that cover the extreme cases of detected target and non-target objects.

In one exemplary embodiment, the subject disclosure provides a system for quality control of automated whole-slide analysis, including a processor, and a memory coupled to the processor, the memory to store computer-readable instructions that, when executed by the processor, cause the processor to perform operations including applying a rule to a plurality of fields-of-view (FOVs) on a whole-slide image of a tissue specimen, and presenting a set of FOVs that match the rule to an observer for a quality control analysis.

In another exemplary embodiment, the subject disclosure provides a computer-implemented method for quality control of an automated whole-slide analysis, including determining a local density of objects of one or more types in a whole-slide image, selecting a plurality of rules based on the local density, and selecting a set of fields-of-view (FOVs) that fulfill the plurality of rules, wherein one of the rules sets a maximum number of FOVs within the set of FOVs.

In yet another exemplary embodiment, the subject disclosure provides a tangible non-transitory computer-readable medium to store computer-readable code that is executed by a processor to perform operations including segmenting a whole-slide image into a plurality of fields-of-view (FOVs), and selecting a set of FOVs that match one or more rules for the selection of FOVs, wherein the rules are applied to heat maps representing a local density of one or more objects of interest in the whole-slide image, and wherein the set of FOVs are presented for quality-control of an image analysis algorithm applied to the whole-slide image

DETAILED DESCRIPTION OF THE SUBJECT DISCLOSURE

The subject disclosure solves the above-identified problems by providing systems and methods for automatically selecting meaningful regions on a whole-slide image or portion thereof of a specimen such as a biological specimen, and performing QC on the resulting collection of FOVs. The automatic selection is performed subsequent to determining a presence and quantity of relevant objects such as cells based on a response to a staining assay applied to the specimen, for example a tissue specimen on the slide. Subsequent to the detection, density maps or "heat maps" may be generated. The heat maps quantify the local density of the detection results. The heat maps may, for instance, depict positive and negative detection results, as well as objects classified as "object of no interest", as well as a local ratio of cell densities, such as a ratio of all cells positive for biomarker 1 that are also positive for biomarker 2. Separate heat maps may be generated for each biomarker or detection result, as depicted in FIGS. 4A-4F. The heat maps as well as combinations of maps (such as a local sum, ratio, etc.) may be provided as input into an automated FOV selection operation. The selection operation may select regions of each heat map that represent opposite extremes and average representative regions, based on one or more rules. One or more selection rules may be defined in order to select a sub-set of FOVs for QC out of a larger list of candidate FOVs. The rules may generally be formulated such that FOVs chosen for quality control are the ones that require the most scrutiny and will benefit the most from an assessment by an expert observer. For example, the selected FOVs may be considered candidates for quality control if they contain regions with the highest, an average, or the lowest values on a heat map or on a combination of heat maps.

Figure 1A:
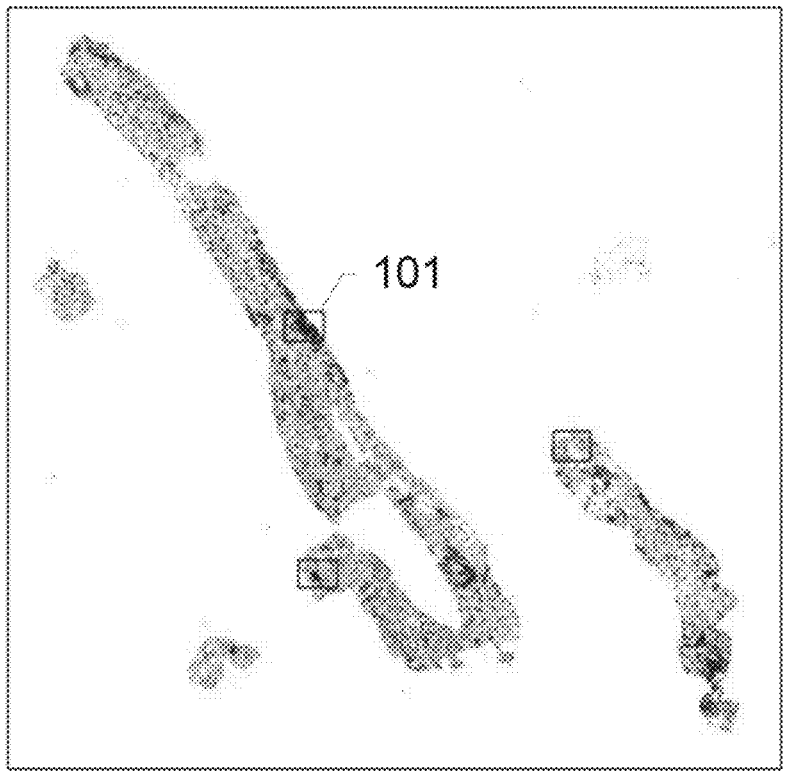
FIGS. 1A-B depict positions of FOVs determined using prior art methods.
Figure 1B:
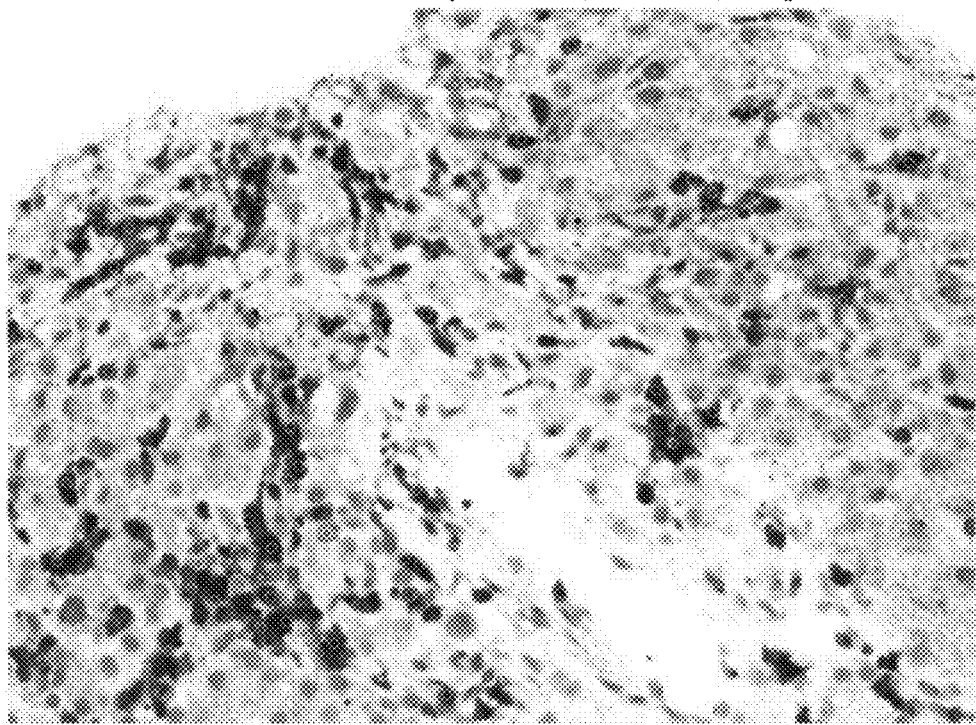
Figure 2:
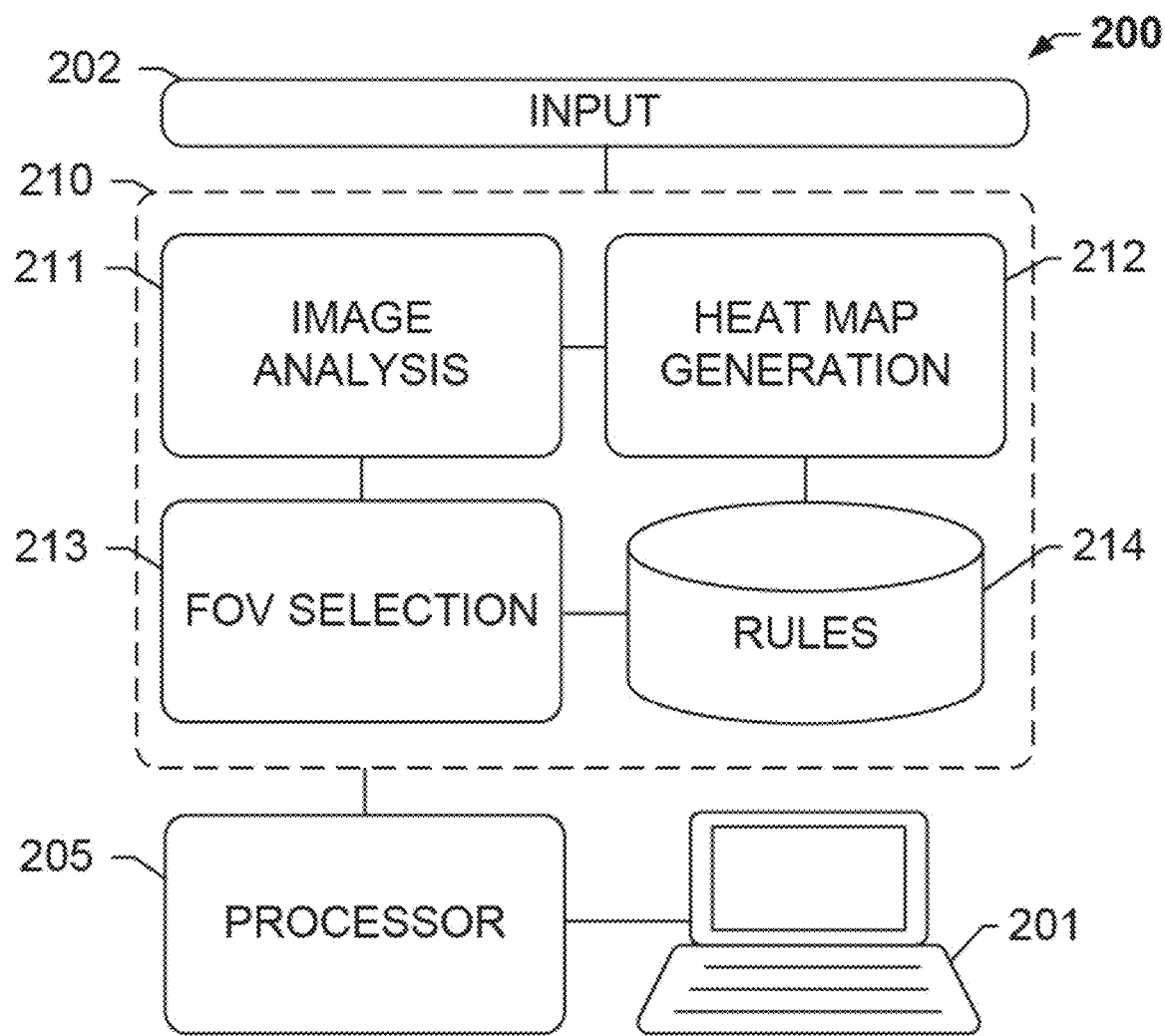
FIG. 2 depicts a system for quality control of automated whole-slide analysis, according to an exemplary embodiment of the present subject disclosure.

FIG. 2 depicts a system 200 for quality control of automated whole-slide analysis, according to an exemplary embodiment of the subject disclosure. System 200 comprises a memory 210, which stores a plurality of processing modules or logical instructions that are executed by processor 205 coupled to computer 201. An input 202 may trigger the execution of one or more of the plurality of processing modules. Input 202 includes user inputs as well as inputs supplied over a network to a network server or database for storage and later retrieval by computer 201. Besides processor 205 and memory 210, computer 201 also includes user input and output devices such as a keyboard, mouse, stylus, and a display/touchscreen. As will be explained in the following discussion, processor 205 executes logical instructions stored on memory 210, performing image analysis to detect and segment objects using image analysis module 211, quantify and depict results using heat maps generation module 112, select FOVs for QC using FOV selection module 213, and store and retrieve rules for heat map generation and FOV selection in rules database 214.

The input 202 may include information about a target tissue type or object, as well as an identification of a staining and/or imaging platform. For instance, the sample may have been stained by means of application of a staining assay containing one or more different biomarkers associated with chromogenic stains for brightfield imaging or fluorophores for fluorescence imaging. Staining assays can use chromogenic stains for brightfield imaging, organic fluorophores, quantum dots, or organic fluorophores together with quantum dots for fluorescence imaging, or any other combination of stains, biomarkers, and viewing or imaging devices. Moreover, a typical sample is processed in an automated staining/assay platform that applies a staining assay to the sample, resulting in a stained sample. There are a variety of commercial products on the market suitable for use as the staining/assay platform, one example being the Discovery™ product of the assignee Ventana Medical Systems, Inc. Input information may further include which and how many specific antibody molecules bind to certain binding sites or targets on the tissue, such as a tumor marker or a biomarker of specific immune cells. Additional information input into system 100 may include any information related to the staining platform, including a concentration of chemicals used in staining, a reaction times for chemicals applied to the tissue in staining, and/or pre-analytic conditions of the tissue, such as a tissue age, a fixation method, a duration, how the sample was embedded, cut, etc. Input 202 may be provided via an imaging system, for example a camera on a microscope or a whole-slide scanner having a microscope and/or imaging components, or may be provided via a network, or via a user operating computer 201.

Image analysis module 211 may be executed in order to detect and/or segment objects of interest within the received image. The objects may be detected, i.e. the presence and location of the objects is reported by the processing, or segmented, i.e. one or more objects are detected and delineated by assigning a plurality of pixels on the wholeslide image to one of either the one or more objects or a background. Several different objects may be detected or segmented and may have different biological meanings that are distinguished to answer a biological question at hand. One possible biological meaning is "object of no interest", indicating that a detection or segmentation result represents non-target staining, slide artefacts, staining too faint to be of relevance, etc. For example, while scoring the biomarker Ki-67, all tumor nuclei are counted and classified into either positively or negatively stained. "Objects of no interests" in this case are the nuclei of all cells on the slide that are not tumor cells, such as immune cells or stroma cells. More generally, the results of image analysis module 211 may be a list of positions in the image where objects have been detected and/or segmented. Optionally, the results from module 211 further include a category or class that further identifies each detected object.

Heat map generation module 212 may be executed to quantify the results of detection and segmentation operations performed by image analysis module 211. A heat map maps the density of various structures on the whole-slide image. Heat maps may be generated depending on the biological question at hand (which also dictates the type of image analysis performed). For example, heat maps may depict positive and negative detection results for objects such as cells, nuclei, etc. Heat maps may further depict "object of no interest", as well as a local ratio of cell densities, such as a ratio of density of one type of cell versus another, or densities of co-location of biomarkers. Separate heat maps may be generated for each biomarker or detection result, as depicted in FIGS. 4A-4F.

Figure 4:
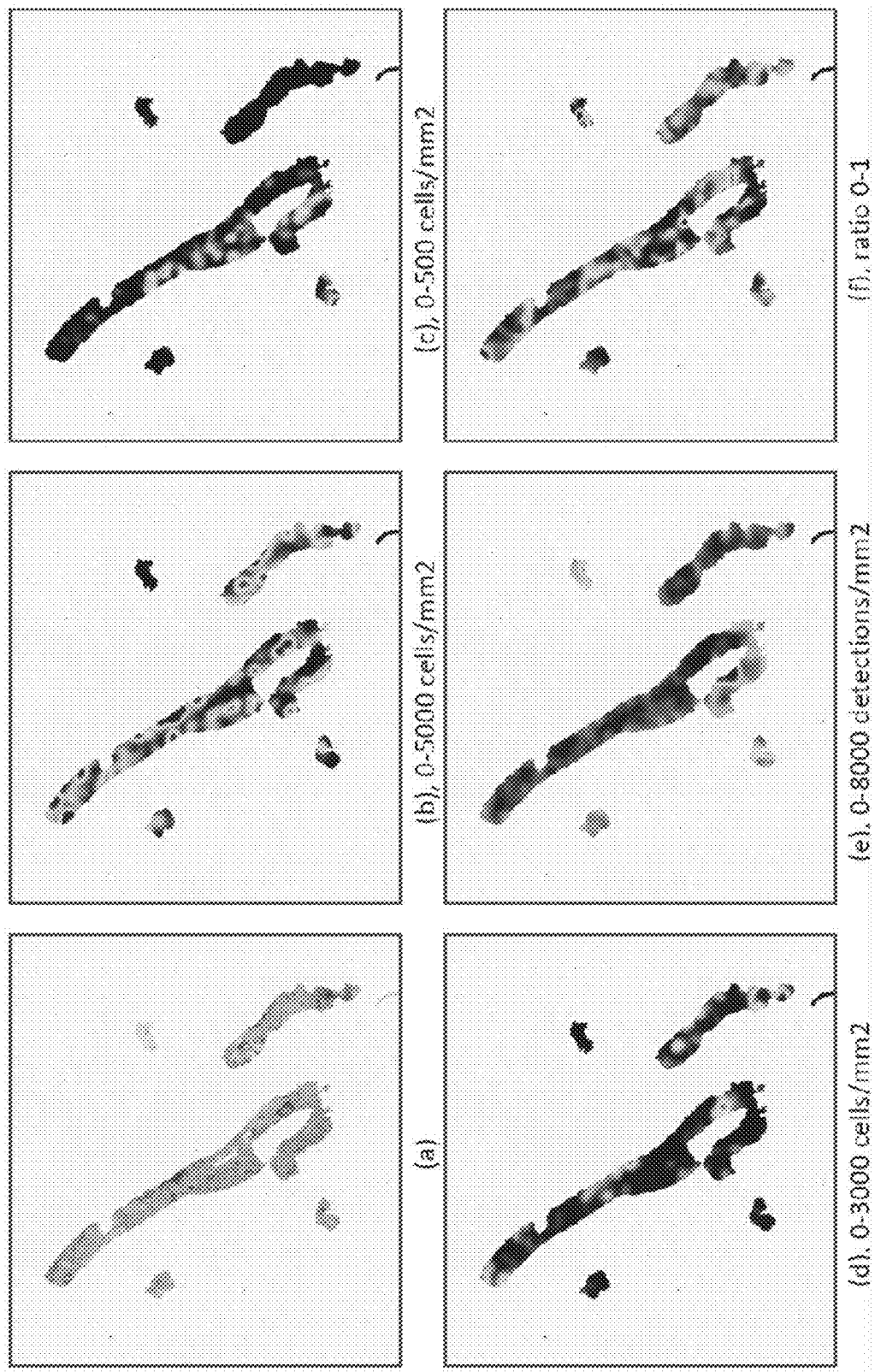
FIG. 4 depicts heat maps showing the density of detection results for tissue for a whole-slide image, according to an exemplary embodiment of the subject disclosure.

FIG. 4, for example, depicts heat maps showing the density of detection results for tissue for a whole-slide image (a). The local density for cells positive only for biomarker 1 is shown in (b), local density for biomarker 2 is shown in (c), positive density for both biomarkers is shown in (d), density of the detection of "objects of no interest" is shown in (e), and the local ratio of cells positive for biomarker 2 to cells positive for biomarker 1 is shown in (f). Referring back to FIG. 2, heat maps may be generated based on heat map rules stored in rule database 214, or rules input via input 202. Exemplary heat map rules are further described herein. Further, database 214 may also include stain information relating to various combinations of stains and counterstains, enabling automated generation of rules, or to mitigate conflicts in rule generation or rule input.

The heat maps and their associated data (such as combinations of quantities depicted in each heat map) may be provided as input into FOV selection module 213. FOV selection module 213 may select regions of each heat map based on selection rules stored in rule database 214 or rules input via input 202. For example, selection rules may require that FOVs representing high and low extremes of detection result densities should be selected and presented for QC. The selection rules may be defined in order to select FOVs for QC from the list of candidate FOVs and may generally be formulated such that FOVs chosen for quality control are the ones that require the most scrutiny and will benefit the most from an assessment by an expert observer. For example, the selected FOVs may be considered candidates for quality control if they contain regions with the highest, an average, or the lowest values on a heat map or on a combination of heat maps. Operations performed by FOV selection module 213 are further described with reference to FIGS. 3A-3B.

As described above, the modules include logic that is executed by processor 105. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 210 that, in an exemplary embodiment, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. Each module may call another module when needed to be executed.

Figure 3A:
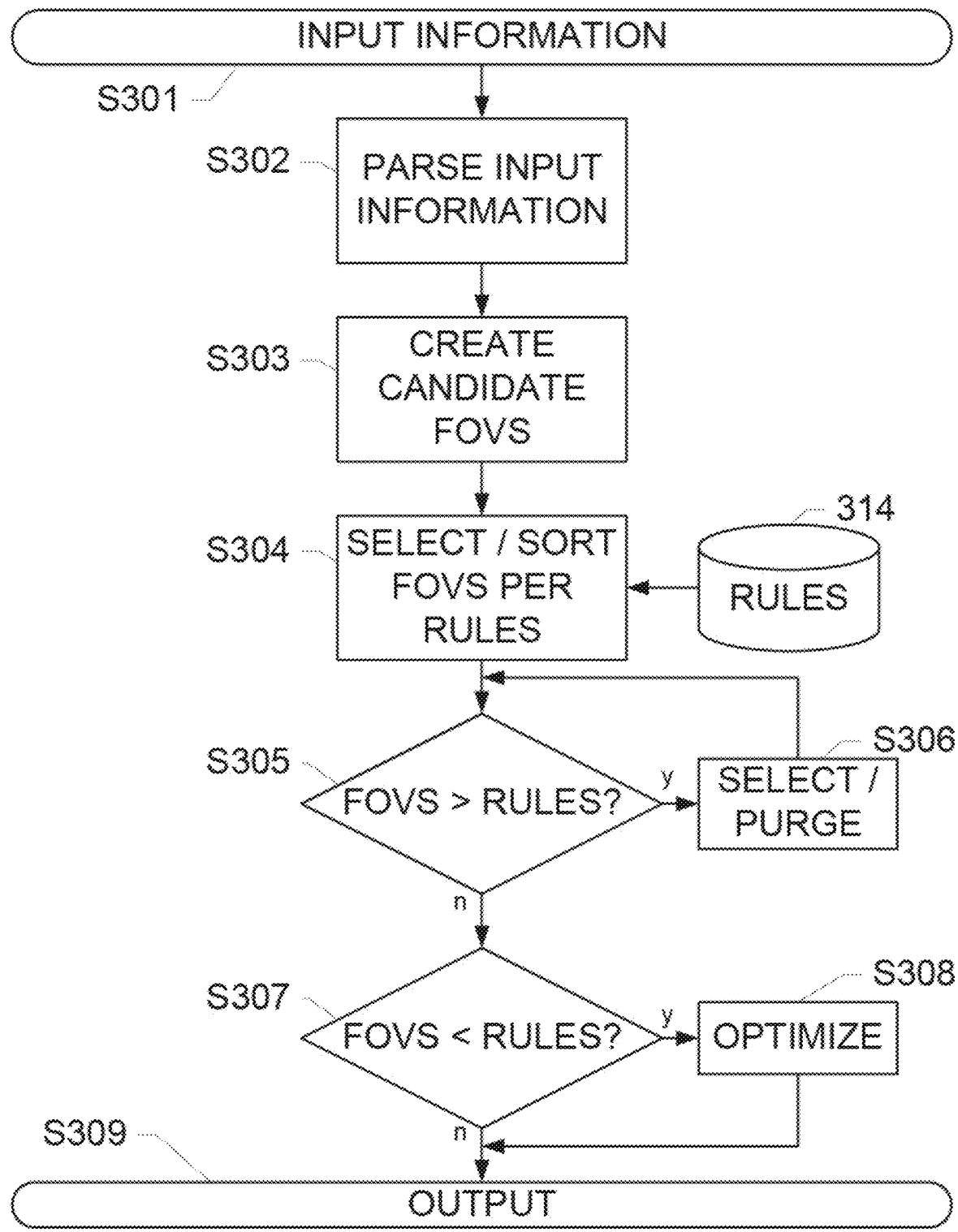
FIGS. 3A-3B depict a method for quality control of automated whole-slide analysis, according to an exemplary embodiment of the present subject disclosure.
Figure 3B:
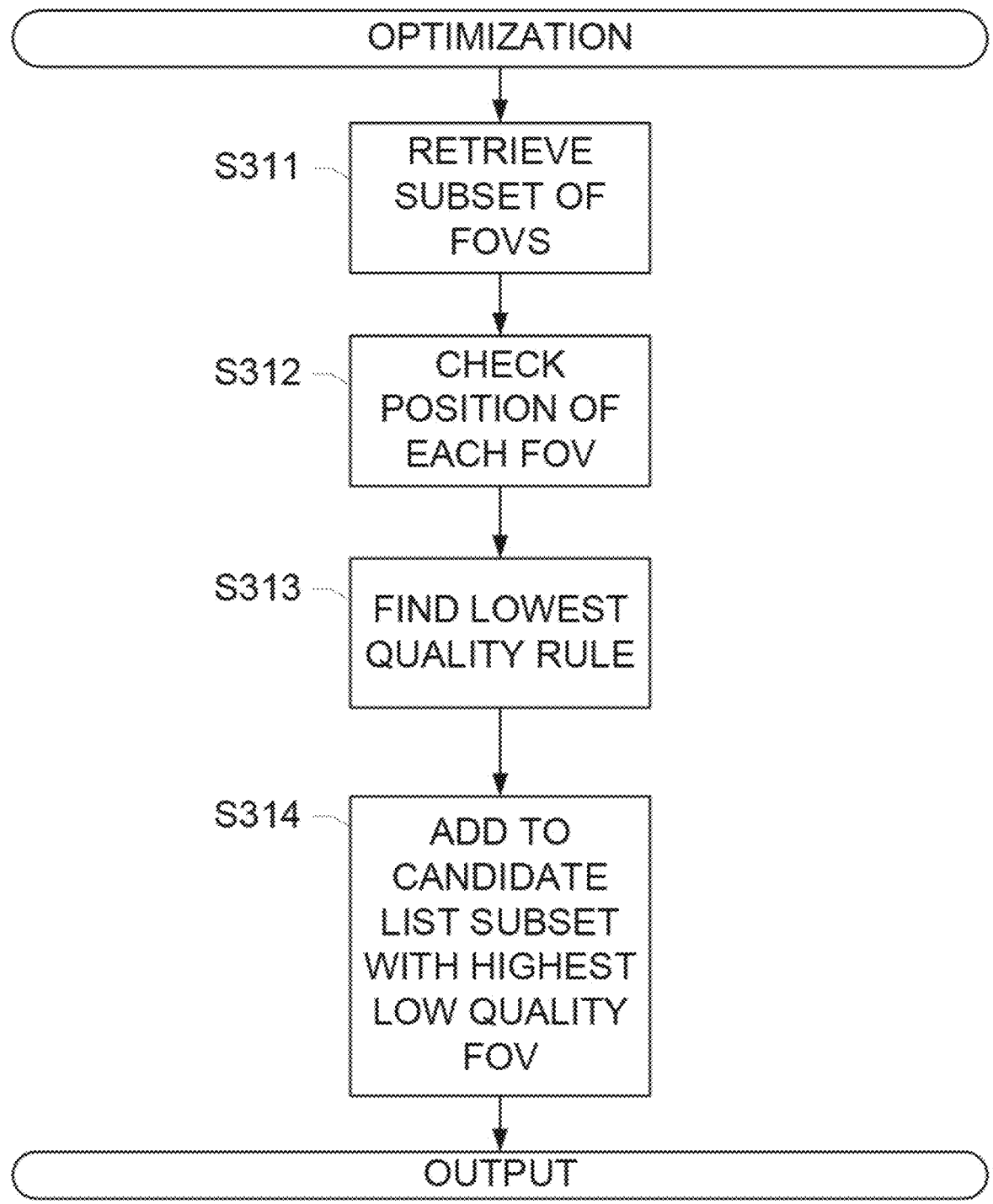

FIGS. 3A-3B show a method for quality control of automated whole-slide analysis, according to an exemplary embodiment of the subject disclosure. The operations described in this exemplary embodiment may use components described with reference to system 200, or other components that perform similar functions. For example, referring to FIG. 3A, an input may be provided (S301) that includes a whole-slide image or portion thereof, as well as results of an analysis operation that may detect or segment objects on the slide, and provide one or more categories or classes of objects as its results. For example, input information may include:

The wholeslide image that was analyzed by an image analysis algorithm known in the art, The position of all objects detected by the automated algorithm, and The object class for all objects as provided by the automated algorithm.

The image analysis results may include, for instance a list of objects of type A and their positions in the wholeslide image together with a list of objects of type B and their position in the wholeslide image. Examples for objects that are algorithm results include the positions of negative nuclei and the position of positive nuclei, the position of nuclei with no membrane staining, with weak membrane staining, and with strong membrane staining, etc. Any such analysis algorithm can be input and used to automatically determine FOVs to QC the results from such an algorithm. For example, image analysis operations may detect and count cells of two different types A and B that have been stained on the tissue specimen. It has been assumed that staining, detecting, and segmentation of these cells are not perfect, such that weak staining, non-target staining or a misinterpretation of segmentation and detection is possible. Assuming that the detection and segmentation operations provide such a list of results, the list may be classified into either being a cell of type A, a cell of type B, or not a target cell. Additional information input may include information about the tissue and target structures such as cells or other structures of interest, specific antibody molecules, a choice of biomarkers, and any information related to the staining platform, as well as user defined rules for selection of FOVs, as further described herein. The image along with analysis results and additional information may be input and parsed (S302) to determine optimal candidate FOV creation (S303) and selection based on rules (S304).

Figure 5A:
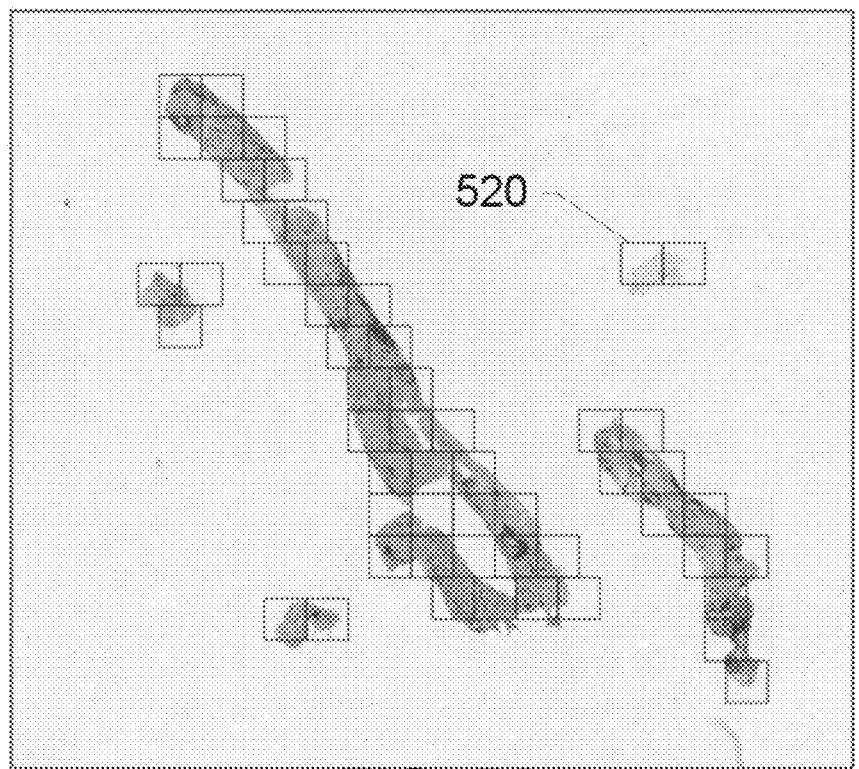
FIGS. 5A-B depict initial sets of candidate FOVs, according to an exemplary embodiment of the subject disclosure.
Figure 5B:
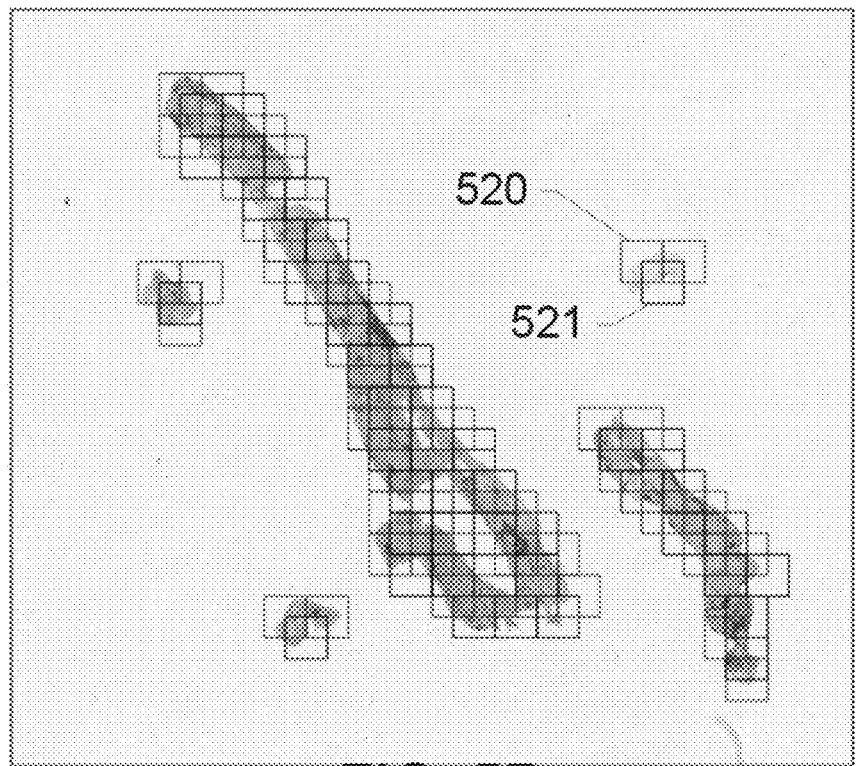

Upon parsing this input (S302), a plurality of candidate FOVs may be created (S303). Typically, a FOV size is chosen such that a FOV can be presented on a computer screen at full resolution. For example, if a computer screen offers 1000×1000 pixels resolution and the pixel in the whole-slide image is 0.5micrometer×0.5 micrometer, then a good FOV candidate size is also 1000×1000 pixels or 0.5 mm×0.5 mm in size. Generally, FOV candidates are created to cover all tissue in the image. This process may be referred to as "tiling". FIGS. 5A-B depict initial sets of candidate FOVs, according to an exemplary embodiment of the subject disclosure. FIG. 5A depicts candidate FOVs 520 created by tiling of all relevant tissue without any overlap. It may be observed that optimal FOV candidates are not likely to coincide with such a tiling grid. Therefore, candidates may be created at many more positions. FIG. 5B depicts additional FOVs 521 added to FOVs 520 for an overlap of approximately 50%. In the color version of this drawing, alternate tiles are shown in red 520 and black 521, respectively. In some extreme cases, every pixel of relevant tissue may be considered as the center of a FOV, which would provide many thousand FOV candidates.

These initial lists of candidate FOVs are generated with FOVs of a specific size, based on whether or not they may be viewed on a computer monitor, on a printed sheet of paper, etc. at sufficient magnification to perform the quality control. The image may have been scanned prior to any analysis, and thus the magnification and pixel size is generally fixed. Therefore, FOV size and resolution for quality control should fit onto a screen. Each screen can display a fixed number of pixels, and that is the size of an FOV, unless a user requests a different size. For example, FOV sizes may be adjusted to match a user's preference. A user preference might be "I prefer more smaller FOVs to view it on my small laptop" or "I can assess the algorithm results even at a lower magnification." The FOV candidates are typically created for regions in the image that contain tissue, and that no FOV candidates are created for regions of the slide that contain no tissue.

Moreover, FOVs do not have to be squares or rectangles, although rectangles enable optimal display on a computer screen or sheet of paper. However, free-form FOV shapes may also be defined, such as round FOVs, if the option is available based on the system implementation. Generally, FOVs are automatically created on each wholeslide image and presented on a computer monitor, printed if necessary, or viewed in any existing digital pathology viewing application. For example, a wholeslide viewer (such as the assignee VENTANA's VIRTUOSO viewer) may be used to automatically navigate to a FOV selected for quality control based on the operations described herein, enabling a user to zoom and pan through the image. Such a viewer may automatically navigate to the FOVs selected out of the original list, with pan and zoom options provided.

Referring back to FIG. 3A, FOVs may be selected and/or sorted (S304) based on application of one or more selection rules. Generally, a preference is to select a small number (for example, 5) of FOVs from the 100 or more candidate FOVs tiled on the wholeslide image. The sub-set of 5 FOVs may be the ones that meet criteria defined by selection rules. These rules may be defined in and retrieved from rules database 314, or any other source including but not limited to input information S301. As described herein, the rules may generally be formulated such that FOVs chosen for quality control are the ones that require the most scrutiny and will benefit the most from an assessment by an expert observer. For example, one set of rules may include the following choices or preferences:

An FOV with highest density of cells of type A,
an FOV with highest density of cells of type B,
an FOV with highest ratio of cells of type A (where a number of cells of type A divided by a sum of number of cells of type A or B is highest),
an FOV with highest ratio of cells of type B,
an FOV with median density of cells of type A and B together, and
an FOV with the highest density of detection results that were classified as "not a target cell" (this may be selected from an intermediate output from an image analysis algorithm).

Application of the above set of rules to all FOVs would likely result in a choice of 6 FOVs for quality control that may be presented to an expert observer via a display or other output device. However, other rule sets may result in a number of target FOVs that is higher or lower than the number of rules. The rules are generally predefined, and a user may be provided with an option to view and edit rules, if desired. A user interface to modify rules may be in the form of a text or spreadsheet editor. For example, a spread sheet editor with pre-defined fields like "highest of", "lowest of", "nth percentile of" in the first field and "objects type A", "objects type B", "objects type C", "objects of A and B", etc. in the second field may be provided. Examples of object types include but are not limited to:

Tumor cells positive for Ki-67 and tumor cells negative for Ki-67.
Tumor cells positive for ER and tumor cells negative for ER
Tumor cells with no Her2 membrane staining, Tumor cells with weak Her2 membrane staining, Tumor cells with intermediate Her2 membrane staining, and tumor cells with strong Her2 membrane staining,
Tumor cells, stroma cells, and immune cells.
T-Lymphocytes and B-Lymphocytes.

As described herein, the rules may be input by a pathologist, and may be predefined such that set of rules that have been input and selected for results from different slides may be applied to new input slides. Therefore, set of pre-defined rules may be provided that a pathologist can choose instead of manually entering the rules.

Typically, there will be either more rules than desired FOVs, or more FOVs desired than rules. For example, the rule that chooses "an FOV with median density of cells of type A and B together" is different from the rules preferring a highest or lowest quantity. Many such rules may be created that, in general, require the choice of "an FOV where the density of cells or any other quantitative result is close to a chosen percentile from all FOVs." To implement such a rule, the FOVs may have to be sorted based on the requirement of the rule. For example, a rule may request some percentile of "density of cells A and B together." Such a rule would result in a sorted list (where the number next to each FOV is a unique serial number or identifier of the listed candidate FOV):

FOV 13
FOV 84
FOV 22
FOV 93
( . . . more FOVs in the sorted list, not shown here . . . )
FOV 45
FOV 29
FOV 27
( . . . more FOVs in the sorted list, not shown here . . . )

FOV 15

FOV 73

The list is created such that the first listed FOV has the highest density, the second listed FOV has the second highest density, and so on down to the last FOV, which has the lowest density. In such a list, FOVs may be selected based on percentiles. The FOV with a median density (the 50% percentile) is the FOV for which half of the FOVs have a higher cell density, and the other half of the FOVs has a lower cell density. Similarly, an FOV at the 25% percentile is chosen such that one quarter of the other FOVs has a lower density, and three quarters have a higher density. An FOV at the 75% percentile is chosen such that three quarters of the other FOVs have a lower density, and only one quarter of the other FOVs has a higher density. In this example, FOVs 13 and 84 are respectively highest and $2^{nd}$-highest, and FOVs 15 and 73 are respectively $2^{nd}$-lowest and lowest. FOV 29 may be at the median, with half the FOVs higher in density and half the FOVs lower in density.

Given such a list, FOVs may also be sorted by "being close to the target percentile". For each FOV, the absolute difference (for example in cell density) is computed to the density of the FOV at the median, the 25% percentile, etc. An exemplary list of FOVs sorted by "difference in density to $75^{th}$ percentile" may provide the following result:

FOV 91

FOV 90

FOV 80

( . . . )

FOV 16

In this example, FOV 91 may be the FOV at the $75^{th}$ percentile (i.e. zero difference), FOV 90 may have the smallest difference in density, and FOV 16 may be the FOV with the highest difference in density to that of the $75^{th}$ percentile (regardless of whether the density is higher or lower). Many other examples of rules and their applications may be contemplated by those having ordinary skill in the art in light of this disclosure, and depending on the biological question that is presented.

When the list of FOVs meeting the criteria of the rules are sorted according to each of the chosen rules, the result may comprise as many sorted lists as there are rules, as depicted in the example of Table 1:

TABLE 1

| Sorted by Rule 1 | Sorted by Rule 2 | . . .Sorted by Rule N |
|---|---|---|
| FOV 13 | FOV 91 | FOV 19 |
| FOV 84 | FOV 90 | FOV 08 |
| FOV 22 | FOV 80 | FOV 25 |
| (. . .) | (. . .) | (. . .) |

Referring back to FIG. 3A, for a wholeslide tissue image, the "Create candidate FOV" operation will generate many FOV candidates, out of which only a small sub-set can be presented to a user for QC. As described herein, the rules may either be pre-defined for each analysis algorithm, or may be selected by a user. These rules are used to select this sub-set. Two different operations "Select and purge" (S306) and "Optimization" (S308) determine that sub-set of FOVs out of all candidate FOVs that best follows the rules. For example, a determination is made if the number of requested FOVs for QC exceeds the number of rules (S305). If there is a greater number of requested FOVs than number of selection rules, then some FOVs may be selected for QC and purged from the lists (S306). For example, each FOV that best matches a rule and has the highest position in a list may be selected for QC. These FOVs may then be removed from that list and purged from all other lists in the table. For example, FOVs 13, 91, and 19 from Table 1 may be chosen for QC, and removed from all other tables, thereby reducing the total number of FOVs for the next round of selection and purging (S306) or optimization (S308). Another method for purging includes removing all FOVs that overlap with one of the chosen FOVs. This enables avoiding presentation of the same tissue section in more than one FOV. The selection and purging step (S306) may be repeated until the number of FOVs that still have to be selected for QC to reach the number of requested FOVs is equal to or less than the number of selection rules.

If there are more rules than FOVs (S307), then an optimization (S308) may be necessary. For example, even after a set of FOVs has already been selected as in the paragraph above, there may end up being fewer FOVs left to obtain the number of requested FOVs than there are rules. In either case, it may be no longer possible to select the best FOV for each rule. Many different sub-sets of FOVs can be selected from the list of candidate FOVs. The optimization process (S308) may now select FOVs such that each rule is fulfilled as well as possible, for instance by computing a "quality" of the set of FOVs that are currently chosen from the tables. Finding the best sub-set may include applying known computer science optimization problems. Therefore, many other formulas can be used as well.

FIG. 3B shows an exemplary optimization operation. One sub-set of FOVs may be retrieved (S311) as an input into a quality determination together with the tables where the sub-sets are sorted according to different criteria (rules). The result of this computation may comprise a number that indicates how good this sub-set is—it measures how "high" the FOVs appear in the table. For example the quality determination may check the position of each FOV in the sub-set (S312), and find the best FOV in the list for the selection rule that is fulfilled worst (S313). Many other rules (average position of all FOVs in all lists in the table, average position of the best FOV in each list in the table, etc.) can be used instead. This "quality" may be computed by checking the position of the best FOV in each table. For example, if 3 FOVs are chosen for 4 rules, and the best FOV in each table is at the positions 3, 5, 10, 2, respectively, than the quality of this set of FOVs is 10. The quality here is a measure that assesses how well a set of FOVs fulfills all the rules together. In the example given here, the position of the best FOV in the list that is the least good fulfilled is used as measure for quality. A different set of FOVs might have the best position in each table at positions 6, 7, 7, 8, with the quality measure 8. Another set of FOVs might have the best position in each table as 1, 2, 1, 20 which results in a quality measure 20. For this quality measure, the set with the lowest quality measure is considered the best selection. As will be evident to those skilled in the relevant art, there are many methods to measure how well a set of FOVs fulfills a set of rules. For any of these quality measures, methods may be employed to optimize the selection, i.e. to determine the set of FOVs that has the best quality measure, with the simplest being the test of all possible FOV selections and choosing the set with the best quality measure (S314). An exhaustive search over all possible FOV sub-sets may result in a quality measure being computed for all possible FOV sub-sets, and the sub-set of FOVs with the best quality measure being chosen (S314). As will be evident to those skilled in the relevant art, there are many methods in addition to exhaustive search that can be used to optimize the FOV sub-set to fulfill all rules. In an exemplary embodiment, a pre-defined number of FOVs are chosen such that they together best represent regions of highest, most representative, and lowest densities of detected objects. For example, one FOV can be chosen if it contains a very high density of a first cell type and a very low density of second cell type, even if it does not contain the highest or lowest respective density for these cell types. Multiple of these replacements and compromises can be performed by the optimization step to cover all relevant features on the slide in few FOVs. After selecting and purging (S306) FOVs and/or optimizing (S308) FOVs, the resultant set of chosen FOVs are output (S309) to an expert observer for analysis and QC.

Figure 6A:
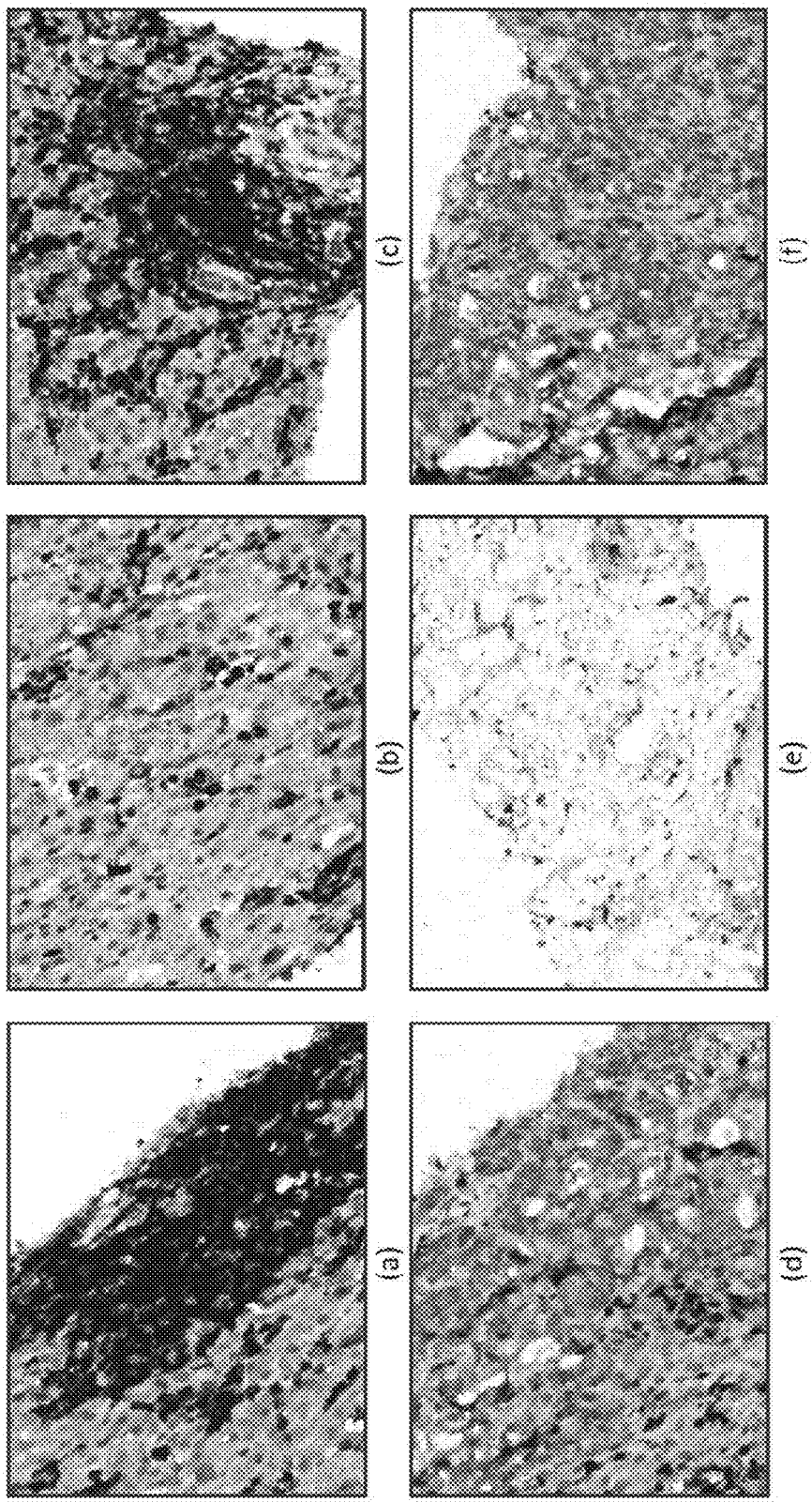
FIGS. 6A-6B depict examples of FOVs that are automatically selected for quality control (QC) via the disclosed operations, according to an exemplary embodiment of the subject disclosure.
Figure 6B:
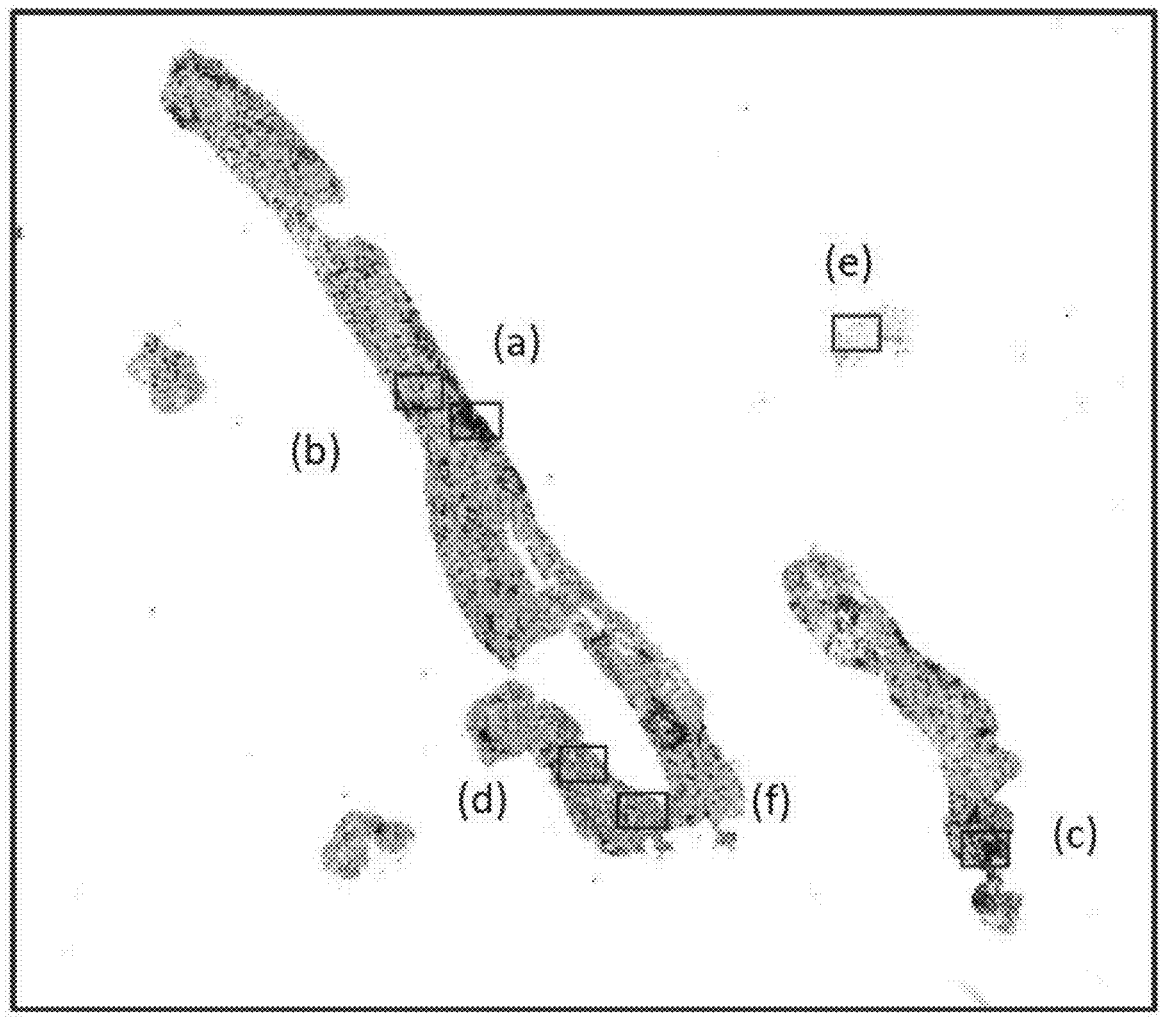

FIGS. 6A-6B depict examples of FOVs that are automatically selected for quality control (QC) via the disclosed operations, according to an exemplary embodiment of the subject disclosure. FIG. 6A depicts the individual FOVs 660, and FIG. 6B depicts the position of these FOVs 660 in a whole-slide image. Referring to FIG. 6A, a region with the highest density of cells positive for only the first biomarker is depicted in (a), a region with the highest density of cells positive for only the second biomarker is depicted in (b), regions with highest density for both biomarkers is depicted in (c), the highest density of "objects of no interest" is depicted in (d), the highest ratio of cells positive for biomarker 2 is depicted in (e), and the region with the lowest density of stained cells of interest is depicted in (f). In this embodiment, the FOVs are selected based on rules that determine that these FOVs require QC the most, for example, (b) could depict a strong non-target staining for biomarker 2 and stain 2 that could result in a false detection of respective cells, (c) may depict regions so strongly stained with biomarker 1 and stain 1 that the analysis might misinterpret the cells as being double-stained, (d) may depict a region with strong non-target staining caused by speckling from stain 1, and (e) may depict a region where non target-tissue was analyzed. For the five maps presented in this example case, choosing FOVs for the highest, an average, and the lowest value on each would result in 15 FOVs, and the application of the optimization (S308) would provide these 5 FOVs to best fulfill such 15 selection rules.

Figure 7:
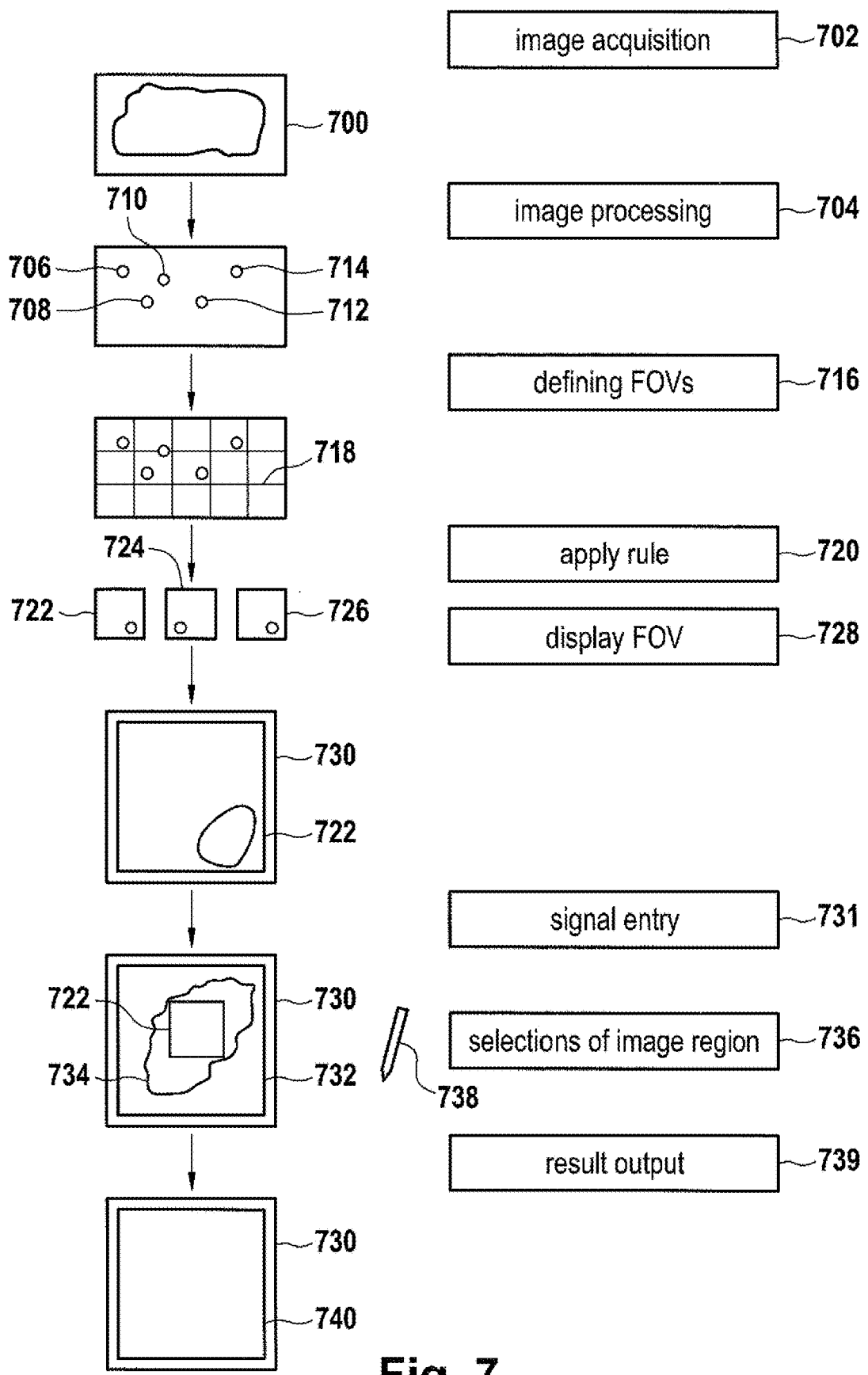
FIG. 7 is illustrative of an embodiment of a method of the invention.

FIG. 7 is illustrative of a method for analyzing a stained biopsy tissue sample in accordance with an embodiment of the invention. A digital whole-slide image 700 that is obtained from a histopathological tissue slide of a stained biopsy tissue sample is received by the input 202 of the image processing system 200 (cf. embodiment of FIG. 2). The image 700 is obtained in an image acquisition step 702 by means of an imaging system from a histopathological slide that carries a tissue sample, for example by means of a camera on a microscope or a whole-slide scanner having a microscope and/or imaging components. The image 700 is stored in the electronic memory 210 of the image processing 200.

In step 704 the digital whole-slide image 700 is read from the memory 210 for execution of an image processing program that implements an image processing algorithm for detection of biological target objects in the whole-slide image. For example, the image processing algorithm serves for detecting the presence and/or shape of one or more types of biological target objects, such as cells, that may be stained by one or more stains. Depending on the implementation a quantitative analysis is performed by the image processing algorithm, such as a determination of the number of biological target objects that is present in the whole-slide image or a portion of the whole-slide image 700.

For illustrative purposes FIG. 7 shows target objects 706, 708, 710, 712 and 714 that have been detected by execution of the image processing algorithm in step 704. It is to be noted that in a practical implementation a much larger number of target objects is typically detected.

The image processing program is executed by the processor 205 of the image processing system 200. In step 716 FOVs are defined in the whole-slide image 700 such as by invoking the FOV selection module 213.

In one implementation the FOVs are predefined by a grid 718, i.e. a tiling grid as shown in FIG. 7. Alternatively predefined FOVs that overlap may be utilized or every pixel of relevant tissue is taken as the center of a FOV which provides a very large number of FOVs. As a further alternative a more complex automated algorithm may be utilized for defining the FOVs in step 716 such as a method known from PCT/EP 2015/070100, international filing date 3 Sep. 2015, claiming priority to US 62/045,484 the entirety of which being herein incorporated by reference.

In the example considered here, execution of step 716 results in a number of 15 FOVs by the tiling grid 718.

In step 720 at least one of the rules stored in rule database 214 is read out from the electronic memory 210 by the processor 205 for application on the FOVs defined in step 716. Application of the at least one rule in step 220 on the set of candidate FOVs results in a sub-set of FOVs that meet a predefined selection criterion. In the example considered here the sub-set contains the FOVs 722, 724 and 726.

In the following step 728 the FOVs that form the sub-set are displayed on a display of the computer 201 of image processing system 200, such as on a display 730.

In one implementation, the FOVs that form the sub-set are displayed sequentially one after the other on the display 730 with full resolution. In other words, the size of the FOVs as defined in step 716 is chosen such that each FOV can be displayed on the display 730 with full resolution and without loss of information. The sequential order with which the FOVs of the sub-set are displayed may be determined depending on a confidence value with which the selection criterion has been fulfilled. For example, the first FOV of the sub-set that is shown on the display 730 is the one that has the highest confidence value of meeting the selection criterion used in the rule applied in step 720.

Alternatively or in addition lower resolution representations of the FOVs 722, 724 and 726 that form the sub-set in the example considered here may be displayed on the display 730 for selection via a graphical user interface of the image processing system 200. In response to selecting one of the FOVs of the sub-set, such as by a mouse click or a pen or stylus entry action, the selected FOV is magnified to its full resolution for detailed review by the observer.

In response to displaying a FOV, such as FOV 722 on display 730 as illustrated in FIG. 7, a signal may be received in step 731 via the graphical user interface of the image processing system 200. Receipt of the signal in step 731 signals to the image processing system 200 that the FOV that is currently shown on display 730 with full resolution, i.e. FOV 722, contains a histopathological artefact or erroneous analysis results In response to receipt of the signal in step 731 an image portion 732 that contains the FOV 722 for which the signal has been received is displayed on the display 730. This portion 732 may be the whole image 700 or a portion of the image 700 that contains the FOV 722 and a region that surrounds the FOV 722. As depicted in FIG. 7 the FOV 722 is located within a histopathological artefact 734 in the example considered here.

In step 736 a selection of an image region to be excluded from the analysis is received via the graphical user interface of the image processing system 200. The selection of this image region may be performed using an annotation tool of the graphical user interface. For example, the display 730 may be implemented as a pen display monitor. By means of a pen or stylus 738 the observer may select the image region that contains the histopathological artefact 734 by tracing the boundary of the histopathological artefact 734 by means of stylus 738. As a consequence of this selection the image region that shows the histopathological artefact 734 is excluded from the analysis, such that any image processing result obtained in step 704 for that image region which covers the histopathological artefact 734 is ignored and excluded from the result that is output in step 739. The resultant output image 740 may show a heat map excluding the histopathological artefact 734.

The disclosed operations therefore mitigate tedious whole-slide QC procedures that are either interactive or require a large number of FOVs, while also avoiding incomplete QC where artefacts can be missed by choosing FOVs that cover the extreme cases of detected target and non-target objects. Moreover, besides medical applications such as anatomical or clinical pathology, prostrate/lung cancer diagnosis, etc., the same methods may be performed to analysis other types of samples such as remote sensing of geologic or astronomical data, etc. The operations disclosed herein may be ported into a hardware graphics processing unit (GPU), enabling a multi-threaded parallel implementation.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Additional Embodiments

1. A method for analyzing a stained biopsy or surgical tissue sample being implemented by an image processing system (200), the method comprising: receiving (702) a whole-slide image (700) from a histopathological tissue slide of the stained tissue sample, analyzing (704) the whole-slide image for detection of biological target objects by execution of an image processing algorithm, applying (720) at least one rule to a plurality of field of views (FOVs) on the whole-slide image for identifying a set of the FOVs (722, 724, 726) for which a criterion is fulfilled that indicates a risk for the respective FOV containing a histopathological artefact or an erroneous detection result caused by the image processing algorithm, wherein the criterion relates to the detection result obtained by execution of the image processing algorithm, displaying (728) at least a sub-set of the set of FOVs for review by an observer, in response to displaying a FOV of the sub-set, receiving (731) an entry signal from the observer that indicates whether the quality of an image portion of the displayed FOV is sufficient for the analysis, outputting (739) a result of the detection of the biological target objects depending on the entry signal.

2. The method of embodiment 1, further comprising: receiving (736) a selection of the image region (734) to be excluded from the analysis from the observer via a graphical user interface of the image processing system, whereby the outputted result is expressive of the detected biological target objects excluding detection results obtained by execution of the image processing algorithm from the excluded image region.

3. The method of embodiment 2, the graphical user interface comprising an annotation tool, wherein the annotation tool is used for entry of the selection of the image region to be excluded from the analysis.

4. The method of embodiment 2 or 3, wherein the image processing system comprises a data entry stylus (738), and wherein the selection of the image region to be excluded from the analysis is performed by using the stylus.

5. The method of embodiment 4, wherein the image processing system comprises a pen display monitor (730), and wherein the stylus is used for entry of a delimitation of the image region to be excluded from the analysis via the pen display monitor by tracing the boundary of an artefact contained in the displayed FOV (722) of the sub-set.

6. The method of any one of the preceding embodiments, wherein the size of the FOVs is selected for display with full resolution on a display monitor (730) of the image processing system.

7. The method of embodiment 6, wherein neighboring FOVs are overlapping.

8. The method of embodiment 7, wherein a FOV is defined by each pixel contained in the whole-slide image.

9. The method of any one of the preceding embodiments, wherein the number of the FOVs contained in the sub-set is limited by a maximal number and wherein the set of the FOVs is sorted by means of a sorting criterion to provide a sorted list and the maximum number of top ranking FOVs is selected from the sorted list to form the sub-set.

10. The method of any one of the preceding embodiments, wherein the stained biopsy tissue sample is a whole mount sample, such as a prostrate sample.

11. An image processing system being configured for execution of a method in accordance with any one of the preceding embodiments.

12. A system (200) for quality control of automated whole-slide analysis, the system comprising: a processor; and a memory coupled to the processor, the memory to store computer-readable instructions that, when executed by the processor, cause the processor to perform operations comprising: applying a rule to a plurality of fields-of-view (FOVs) on a whole-slide image of a tissue specimen; and presenting a set of FOVs that match the rule to an observer for a quality control analysis.

13. The system of embodiment 12, wherein the operations further comprise determining a local density of one or more objects of interest in the whole-slide image.

14. The system of embodiment 13, wherein the local density is depicted by a heat map.

15. The system of embodiment 14, wherein the rule is applied to the heat map.

16. The system of embodiment 15, wherein the one or more objects are determined to be of more than one type.

17. The system of embodiment 16, wherein a plurality of heat maps are generated for a corresponding plurality of types of objects.

18. The system of embodiment 17, wherein the local density is determined based on the rule.

19. The system of embodiment 18, wherein the rule comprises a selection of an FOV having a highest density of a target structure or biomarker.

20. The system of embodiment 19, wherein the rule comprises a selection of an FOV having a lowest density of a target structure or biomarker.

21. The system of embodiment 20, wherein the rule comprises a selection of an FOV having a density of a target structure or biomarker that is closest to a target percentile of density within the whole-slide image of said target structure or biomarker.

22. The system of embodiment 21, wherein the rule is one among a plurality of rules.

23. The system of embodiment 22, wherein upon a determination that the set of FOVs that match the plurality of rules exceeds the number of rules, the operations further comprise selecting and purging a sub-set of FOVs.

24. The system of embodiment 23, wherein purging the sub-set of FOVs comprises one or more of removing duplicate FOVs that match more than one rule, or removing FOVs that overlap other FOVs in the set by a threshold overlap.

25. The system of embodiment 24, wherein upon a determination that the set of FOVs that match the plurality of rules is smaller than the number of rules, the operations further comprise optimizing the FOVs that match the rule.

26. The system of embodiment 25, wherein the optimizing comprises selecting additional FOVs from among the plurality of FOVs that have an overall lowest distance to an FOV that best matches the rule, in addition to the FOV that best matches the rule.

27. The system of embodiment 26, wherein the overall lowest distance is determined by sorting the FOVs in a list or table.

28. The system of embodiment 12, wherein each of the plurality of FOVs has a unique identifier.

29. The system of embodiment 12, wherein the operations further comprise generating the plurality of FOVs based on one or more of a resolution of the image or a resolution of a display device.

30. A computer-implemented method for quality control of an automated whole-slide analysis, the method comprising: determining a local density of objects of one or more types in a whole-slide image; selecting a plurality of rules based on the local density; and selecting a set of fields-of-view (FOVs) that fulfill the plurality of rules; wherein one of the rules sets a maximum number of FOVs within the set of FOVs.

31. A tangible non-transitory computer-readable medium to store computer-readable code that is executed by a processor to perform operations comprising: segmenting a whole-slide image into a plurality of fields-of-view (FOVs); and selecting a set of FOVs that match one or more rules for the selection of FOVs; wherein the rules are applied to heat maps representing a local density of one or more objects of interest in the whole-slide image; and wherein the set of FOVs are presented for quality-control of an image analysis algorithm applied to the whole-slide image.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A method for analyzing a stained biopsy or surgical tissue sample being implemented by an image processing system, the method comprising:
receiving a whole-slide image from a histopathological tissue slide of the stained tissue sample,
analyzing the whole-slide image for detection of biological target objects by execution of an image processing algorithm,
applying at least one rule to a plurality of field of views (FOVs) on the whole-slide image for identifying a set of the FOVs for which a criterion is fulfilled that indicates a risk for the respective FOV containing a histopathological artefact or an erroneous detection result caused by the image processing algorithm, wherein the criterion relates to the detection result obtained by execution of the image processing algorithm, displaying at least a sub-set of the set of FOVs for review by an observer,
in response to displaying a FOV of the sub-set, receiving an entry signal from the observer that indicates whether the quality of an image portion of the displayed FOV is sufficient for the analysis,
outputting a result of the detection of the biological target objects depending on the entry signal.

2. The method of claim 1, further comprising: receiving a selection of an image region to be excluded from an analysis from the observer via a graphical user interface of the image processing system, whereby the outputted result is expressive of the detected biological target objects excluding detection results obtained by execution of the image processing algorithm from the excluded image region.

3. The method of claim 2, the graphical user interface comprising an annotation tool, wherein the annotation tool is used for entry of the selection of the image region to be excluded from the analysis.

4. The method of claim 2, wherein the image processing system comprises a data entry stylus, and wherein the selection of the image region to be excluded from the analysis is performed by using the stylus.

5. The method of claim 4, wherein the image processing system comprises a pen display monitor, and wherein the stylus is used for entry of a delimitation of the image region to be excluded from the analysis via the pen display monitor by tracing the boundary of an artefact contained in the displayed FOV of the sub-set.

6. The method of claim 1, wherein the size of the FOVs is selected for display with full resolution on a display monitor of the image processing system.

7. The method of claim 6, wherein neighboring FOVs are overlapping.

8. The method of claim 7, wherein the FOVs are defined by each pixel contained in the whole-slide image.

9. The method of claim 1, wherein a number of the FOVs contained in the sub-set is limited by a maximal number and wherein the set of the FOVs is sorted by means of a sorting criterion to provide a sorted list, and the maximum number of top ranking FOVs is selected from the sorted list to form the sub-set.

10. The method of claim 1, wherein the stained biopsy tissue sample is a whole mount sample.

11. A system for quality control of automated whole-slide analysis, the system comprising:
a processor; and
a memory coupled to the processor, the memory to store computer-readable instructions that, when executed by the processor, cause the processor to perform operations comprising:
determining a local density of one or more objects of interest in a whole-slide image, wherein the local density is depicted by a heat map, and wherein the one or more objects of interest comprise more than one type of object of interest;
generating a plurality of fields of view (FOV) based on the depicted heat map;
applying a rule to the plurality of generated FOVs to select a set of FOVs that match the applied rule; and
presenting the selected set of FOVs to an observer for a quality control analysis.

12. The system of claim 11, wherein a plurality of heat maps are generated for a corresponding plurality of types of objects.

13. The system of claim 11, wherein the applied rule comprises a selection of an FOV having a highest density of a target structure or biomarker.

14. The system of claim 13, wherein the rule comprises a selection of an FOV having a lowest density of a target structure or biomarker.

15. The system of claim 14, wherein the rule comprises a selection of an FOV having a density of a target structure or biomarker that is closest to a target percentile of density within the whole-slide image of said target structure or biomarker.

16. The system of claim 15, wherein the rule is one among a plurality of rules.

17. The system of claim 16, wherein upon a determination that the set of FOVs that match the plurality of rules exceeds the number of rules, the operations further comprise selecting and purging a sub-set of FOVs, wherein the purging of the sub-set of FOVs comprises one or more of (i) removing duplicate FOVs that match more than one rule, and/or (ii) removing FOVs that overlap other FOVs in the set by a threshold overlap.

18. The system of claim 17, wherein upon a determination that the set of FOVs that match the plurality of rules is smaller than the number of rules, the operations further comprise optimizing the FOVs that match the rule, wherein the optimizing comprises selecting additional FOVs from among the plurality of FOVs that have an overall lowest distance to an FOV that best matches the rule, in addition to the FOV that best matches the rule, and wherein the overall lowest distance is determined by sorting the FOVs in a list or table.

19. The system of claim 11, wherein each of the plurality of FOVs has a unique identifier.

20. A system for quality control of automated whole-slide analysis, the system comprising:
a processor; and
a memory coupled to the processor, the memory to store computer-readable instructions that, when executed by the processor, cause the processor to perform operations comprising:
detecting one or more target objects within at least a portion of a whole slide image of a stained biological specimen using an automated image processing algorithm;
generating a plurality of fields of view (FOV) based on the at least the portion of the whole slide image of the stained biological specimen;
applying one or more rules to the plurality of generated FOVs; and
based on the detected one or more target objects within the at least the portion of the whole slide image, selecting a set of FOVs for quality control analysis that match the applied rule.

21. The system of claim 20, wherein the applied rule selects a first FOV comprising a highest density of a first type of detected target object.

22. The system claim 21, wherein the applied rule selects a second FOV comprising a highest density of a second type of detected target object.

23. The system of claim 22, wherein the first type of target object is a first type of cell and the second type of target object is a second type of cell.

24. The system of claim 21, wherein the applied rule selects a FOV having a highest density of detected objects classified as not belong to a target cell.

25. The system of claim 20, further comprising displaying on a display the selected set of FOVs.

* * * * *